US011225039B2

(12) United States Patent
Choi et al.

(10) Patent No.: US 11,225,039 B2
(45) Date of Patent: Jan. 18, 2022

(54) SYSTEMS AND METHODS TO AUTOMATE COMPOSITE MANUFACTURING QUALITY CHECKS

(71) Applicant: Aurora Flight Sciences Corporation, Manassas, VA (US)

(72) Inventors: Jae-Woo Choi, Manassas, VA (US); John Tylko, Manassas, VA (US); Konstantine Fetfatsidis, Manassas, VA (US); James D. Paduano, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 129 days.

(21) Appl. No.: 16/003,305

(22) Filed: Jun. 8, 2018

(65) Prior Publication Data

US 2019/0375171 A1 Dec. 12, 2019

(51) Int. Cl.
*B29C 70/54* (2006.01)
*B29C 70/38* (2006.01)

(52) U.S. Cl.
CPC ............ *B29C 70/54* (2013.01); *B29C 70/382* (2013.01)

(58) Field of Classification Search
CPC ... B29C 66/961; B29C 66/962; B29C 66/963; B29C 70/38; B29C 70/382; B29C 70/384; B29C 70/386; B29C 70/388; B29C 70/54
See application file for complete search history.

(56) References Cited

U.S. PATENT DOCUMENTS 6,167,607 B1  1/2001  Pryor
6,816,747 B2  11/2004  Mammoser et al.
(Continued)

FOREIGN PATENT DOCUMENTS

EP  3007022 B1  11/2020
WO  2016/186682 A1  11/2016

OTHER PUBLICATIONS

S. S. J. Roberts et al: "Cure and fabrication monitoring of composite materials with fibre-optic sensors," Composites Science and Technology, vol. 49, No. 3, Jan. 1, 1993 (Jan. 1, 1993), pp. 265-276, XP055637854, Amsterdam, NL ISSN: 0266-3538, DOI: 10.1016/0266-3538(93)90108-S.

(Continued)

*Primary Examiner* — George R Koch
(74) *Attorney, Agent, or Firm* — Michael Stanley Tomsa; McAndrews, Held & Malloy, Ltd.; Eugene H. Nahm

(57) ABSTRACT

An automated inspection system for monitoring a manufacturing process includes a core platform to operatively connect a plurality of systems or subsystems via one or more interfaces. A sensor system operatively coupled with the core platform to monitor one or more characteristics of a manufactured article. An actuation system operatively coupled with the core platform to implement the manufacturing process based on instruction from the core platform. The core platform is configured to receive a first measurement of the one or more characteristics of a composite article from the sensor system after application of a plurality of layers of one or more raw materials; receive data regarding a second measurement of the one or more characteristics from the sensor system after curing the composite article; and generate an alert in response to a determination that a defect exists in the composite article based on the first or second measurement.

20 Claims, 16 Drawing Sheets

(56) References Cited

U.S. PATENT DOCUMENTS

| | | | |
|---|---|---|---|
| 6,826,518 B1 | 11/2004 | Ivezic et al. | |
| 7,443,282 B2 | 10/2008 | Tu et al. | |
| 7,969,306 B2 | 6/2011 | Ebert et al. | |
| 8,069,071 B2 | 11/2011 | Kall et al. | |
| 8,468,670 B2 | 6/2013 | Baigorri Hermoso | |
| 8,965,539 B2 | 2/2015 | Hayes et al. | |
| 9,134,725 B2 | 9/2015 | Gaeta | |
| 9,187,188 B2 | 11/2015 | Richter et al. | |
| 9,205,933 B2 | 12/2015 | Oberoi et al. | |
| 9,233,469 B2 | 1/2016 | Lee et al. | |
| 9,486,971 B2 | 11/2016 | Zieger et al. | |
| 9,563,863 B2 | 2/2017 | Nielsen et al. | |
| 2006/0191622 A1* | 8/2006 | Ritter | G01N 25/72 156/64 |
| 2009/0199948 A1* | 8/2009 | Kisch | B29C 70/38 156/64 |
| 2014/0110875 A1* | 4/2014 | Khan | B29C 70/54 264/40.5 |
| 2016/0077027 A1* | 3/2016 | Sweers | B29C 66/45 324/654 |
| 2017/0015070 A1* | 1/2017 | Bauer | G01M 5/0033 |
| 2017/0100894 A1* | 4/2017 | Burns | B29C 35/0288 |
| 2017/0350764 A1* | 12/2017 | Thompson | G01J 5/10 |
| 2018/0067464 A1* | 3/2018 | Budge | B29C 64/393 |
| 2018/0311914 A1* | 11/2018 | Marcoe | B29C 70/38 |
| 2019/0018400 A1* | 1/2019 | McCann | G05B 19/4063 |
| 2019/0318444 A1* | 10/2019 | Juarez | G01N 21/8851 |

OTHER PUBLICATIONS

Martina Hobner et al. "Online Monitoring of Composites with a Miniaturized Flexible Combined Dielectric and Temperature Sensor," Proceedings, vol. 1, No. 4, Jan. 1, 2017 (Jan. 1, 2017), p. 627, XP055638140, DOI: 10.3390/proceedings1040627.

Nikos G. Pantelelis et al: "Automatic Process monitoring and control for composite production," JEC Composites Magazine, May 1, 2010 (May 1, 2010), pp. 32-34, XP055638125, Retrieved on Oct. 31, 2019 from the Internet: URL: https://www.synthesites.com/resources/files/JEC57-32-34-iREMO.pdf.

Saliba T. et al: "Expert model for intelligent control of composite materials processing in a press," Composites Engineering, Elsevier Science Ltd, GB, vol. 2, No. 2, Feb. 1, 1992 (Feb. 1, 1992), pp. 105-115, XP023626453, ISSN: 0961-9526, DOI: 10.1016/0961-9526(92)90049-C [retrieved on Feb. 1, 1992].

Extended European search report for EU application No. 19178574.0, dated Nov. 8, 2019.

Communication for EU application No. 19178574.0, dated Oct. 26, 2021.

* cited by examiner

SYSTEMS AND METHODS TO AUTOMATE COMPOSITE MANUFACTURING QUALITY CHECKS

FIELD

The present invention relates to the field of composite materials manufacturing systems, methods, and apparatuses; even more particularly, to systems, methods, and apparatuses for automated quality checks for manufactured composite materials.

BACKGROUND

Lean manufacturing is a systematic method for waste minimization within a manufacturing system while maintaining high productivity. Lean manufacturing takes into account the waste created through unbalanced manufacturing processes, and seeks to identify and focus on products and services that add value to the process. Successful lean manufacturing requires development of tools that assist in the identification and steady elimination of waste. With the growing demands placed on automation in the manufacturing floor to improve yields, methods to improve communication between the machine and supervising operators are increasingly valuable. Thus, a need exists for an open architecture system that enables quick introduction of new capabilities, increases safety, grows functionality, and reduces defective manufactured articles—without large expense or retrofitting in manufacturing settings.

SUMMARY

The present invention relates to the field of composite materials manufacturing systems, methods, and apparatuses; even more particularly, to systems, methods, and apparatuses for automated quality checks for manufactured composite materials.

According to a first aspect, an automated inspection system for monitoring a manufacturing process comprises: a core platform to operatively connect a plurality of systems or subsystems via one or more interfaces; and a sensor system operatively coupled with the core platform to monitor one or more characteristics of a composite article being manufactured, the core platform configured to: receive a first measurement of the one or more characteristics of a composite article from the sensor system while forming the composite article; receive data regarding a second measurement of the one or more characteristics from the sensor system after curing the composite article; and generate an alert in response to a determination that a defect exists in the composite article based on the first or second measurement.

In certain aspects, the system further comprises a state manager operatively coupled with the core platform to determine a defect associated with the one or more characteristics.

In certain aspects, the state manager is configured to determine whether a first defect exists in the composite article based on the first measurement.

In certain aspects, the state manager is configured to determine whether a second defect exists in the composite article based on the second measurement.

In certain aspects, the state manager is configured to: identify a value corresponding to the one or more characteristics associated with the defect based on the first or second measurement; and calculate a score representing the degree of the defect of the manufactured article based on the identified value.

In certain aspects, the core platform further configured to: receive data regarding a third measurement of the one or more characteristics after performing a trim operation on the composite article; determine whether a third defect exists in the composite article based on the third measurement; and generate an alert in response to a determination that a third defect exists in the composite article.

In certain aspects, the system further comprises a human machine interface operatively coupled with the core platform to provide an interface between an operator and the system.

In certain aspects, the core platform is configured to transmit the alert to the human machine interface, the alert comprising one of an audible or visual alert presented by the human machine interface.

In certain aspects, the system further comprises an actuation system operatively coupled with the core platform to implement the manufacturing process based on instruction from the core platform, wherein the core platform transmits the alert and information regarding the first or second defect to the actuation system to adjust an operating value of a manufacturing process of the system.

In certain aspects, the operating value comprises one of a speed of the manufacturing process, a temperature of the curing stage, and a position of the composite article.

In certain aspects, the sensor system is operatively coupled with one or more of a non-contact ultrasound sensor, a laser sensor, an impedance sensor, an infrared sensor, or a heat sensor.

In certain aspects, the sensor system monitors the one or more characteristics by two or more sensors of the sensor system to determine the first or second defect.

In certain aspects, the characteristic comprises one of a density, a temperature, a chemical composition, and a thickness associated with the composite article.

According to a second aspect, a method of determining the integrity of a composite article comprises: measuring, by a sensor, a first characteristic corresponding to integrity of a composite article while forming the composite article; measuring, by the sensor, a second characteristic corresponding to integrity of the composite article after curing the composite article; identifying, at a core platform, a defect based on the characteristic; and generating an alert in response to a determination that a defect exists in the composite article based on the first or second characteristic.

In certain aspects, the method further comprises: determining, by the core platform, a defect value associated with the first or second characteristic; comparing the defect value to a plurality of defect values; and designating the manufactured article as containing a defect based on the comparison.

In certain aspects, the method further comprises: identifying, by the core platform, a stage at which the defect appears; and adjusting an operating value of a manufacturing process based on the identification.

In certain aspects, the operating value comprises one of a speed of the manufacturing process, a temperature of the curing stage, and a position of the composite article.

In certain aspects, the first or second characteristic comprises one of a density, a temperature, a chemical composition, and a thickness associated with the composite article.

In certain aspects, the method further comprises transmitting the alert to a human machine interface operatively coupled with the core platform.

In certain aspects, the alert comprises video or audio identifying the defect.

DESCRIPTION OF THE DRAWINGS

These and other advantages of the present invention may be readily understood with the reference to the following specifications and attached drawings wherein:

FIG. 1c illustrates an example flow of information data between subsystems of FIG. 1a.

DESCRIPTION

Figure 1A:
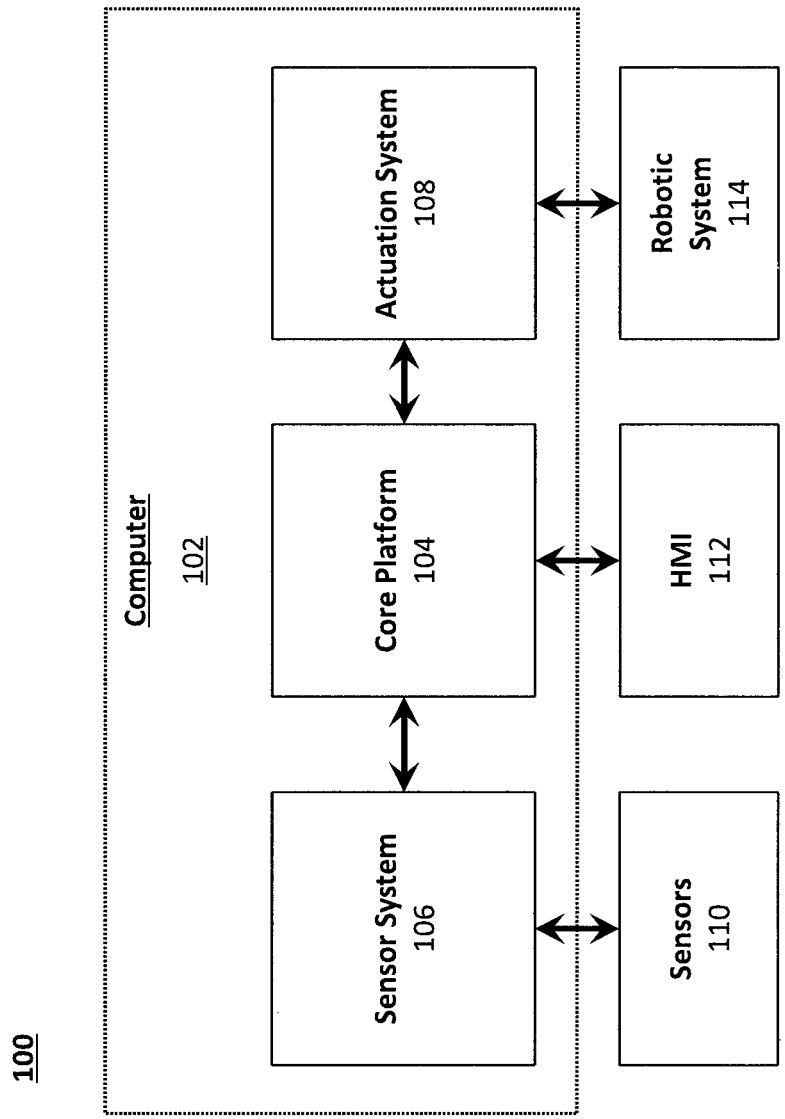
FIG. 1a illustrates a block diagram of an example automation system.

Preferred embodiments of the present invention may be described hereinbelow with reference to the accompanying drawings. In the following description, well-known functions or constructions are not described in detail because they may obscure the invention in unnecessary detail. For this disclosure, the following terms and definitions shall apply.

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "in-situ" refers to actions performed during manufacturing operations such that the ongoing process is not interrupted. In this manner, for example, the testing phase is performed without taking the item under test from the manufacturing flow.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

The terms "about" and "approximately," when used to modify or describe a value (or range of values), mean reasonably close to that value or range of values. Thus, the embodiments described herein are not limited to only the recited values and ranges of values, but rather should include reasonably workable deviations. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

With the advent of the Internet of Things (IoT), whereby computing devices are embedded into everyday objects, the capability of sensing, processing, and communicating task-to-task details has become ubiquitous. To ensure continuous improvement in lean manufacturing, development should focus on issues of data analytics. For example, a computing architecture and infrastructure capable of communicating with a plurality of information sources (e.g., sensors, databases, interfaces, etc.) and/or analyzing data (e.g., firmware, hardware, software, algorithms, etc.) is desirable, such that all data can be compiled into a centralized server and/or data storage. Further, with the proliferation of cheap, accurate sensors, the amount of data to parse to obtain meaningful information requires thoughtful consideration. Therefore, there is great potential to use sensors to obtain data from a variety of processes; however, significant hurdles remain before a complete solution is achieved.

Computing architecture and infrastructure capable of parsing large amounts of data to obtain meaningful information in the context of a variety of systems, for example, the state of an aircraft, the actions of a pilot within that state, and others have been researched and developed over the years. Hardware and software architecture have been developed to benefit manufacturing technologies. As an example, a system can be configured to utilize cameras, a core computer containing core operating principles, and a human machine interface (HMI) (e.g., a tablet or other computing device) to accept commands and/or share information with an operator. In this manner, data can be digitized, such that the manufacturing process checklist can be configured to check for defects (e.g., FOD) on composite manufactured articles. It is further considered that the principles and/or systems described herein will have wide applicability for data capture and analytics, in order to perform continuous improvement leading to increasing automation. Ultimately, the necessity of a manual inspection by a Level 3 nondestructive testing (NDT) technician may be eliminated through the methods and systems described herein.

In order to validate a quality measure for one or more characteristics of the composite article, the systems and methods described herein are configured to capture sensor data from a variety of sources and consume and analyze the data in real-time. Therefore, the quality of the potential output can be assessed at multiple stages before a final product is delivered. Advantageously, an error in the manufacturing process/equipment and/or a defect in the manufactured article can be identified at any number of stages and can initiate a response (e.g., an alert, adjustment in the process, etc.) in order to bolster quality in the manufacturing process and produced articles at the earliest possible level to avoid compounding defects in a lean manufacturing environment.

Disclosed herein is a system configured to, inter alia, provide automated quality checks for manufactured composite articles. The system can be configured to perform, for example, a five-step process, which includes in-situ inspection steps at the layup stage, the cure stage, and the trim stage. In particular, the layup stage can perform, for example, a non-contact ultrasound ("NCU") inspection, the cure stage can perform an in-situ validation, whereas the trim stage can employ in-situ non-destructive inspection ("NDP"). Thus, at each of these stages, a separate inspection protocol can be employed. Data to identify defects after a particular stage of the manufacturing process can thus be generated, data that can be used to alert and/or inform an operator or system manager, as well as take action to correct such defects (e.g., adjust a parameter of the manufacturing process).

Described herein is a hardware and/or software architecture which can enable data from multiple sensors to be collected, provided to a core computing platform, analyzed by the core platform, and an alert and/or adjustment can be made in response to an identified issue. In addition to the base architecture, the system can employ one or more subsystems, including a plurality of sensors, to quantify characteristic values associated with the composite article at multiple stages of the manufacturing process.

FIG. 1a shows a checklist/inspection automation system 100 that includes a computer 102 (e.g., a processor, microcontroller, etc.) having one or more of a core platform 104, a sensor system 106, and an actuation system 108. The system 100 involves the centralization of data via the hardware and software architecture. Additionally, an inspector can be employed as truth data, such as stored in a data storage medium (e.g., integrated with the core platform, remote from the core platform and linked via a network, etc.). In this manner, the quality from a computer based inspection checklist may be at a level similar to or greater than a human inspector might achieve. In some examples, the system 100 can be validated by a Turing test; in other words, in identifying issues (e.g., defects) in the composite article, a computer may achieve results similar to that of a human.

Figure 1B:
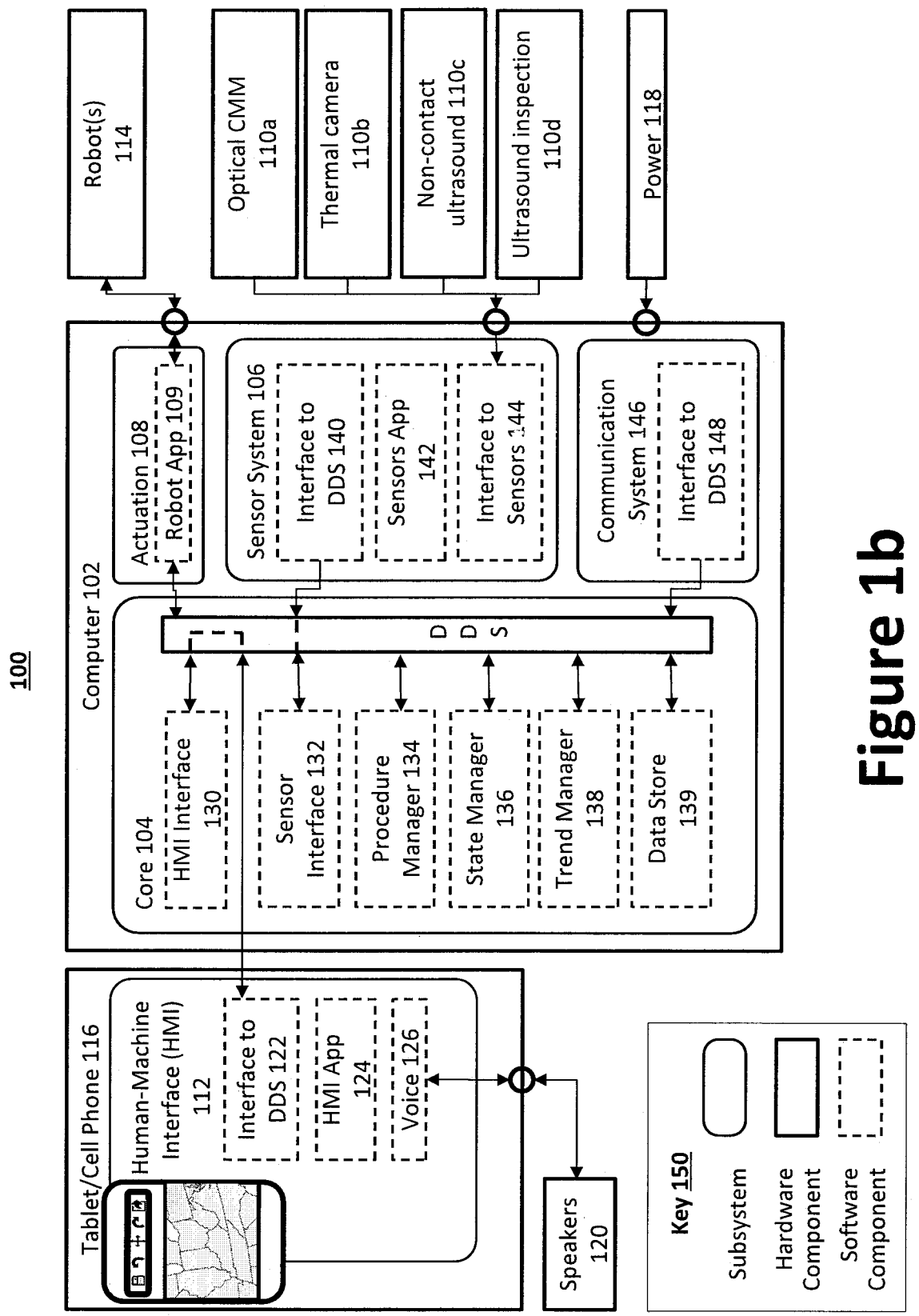
FIG. 1b illustrates a diagram of an example system architecture.
Figure 1C:
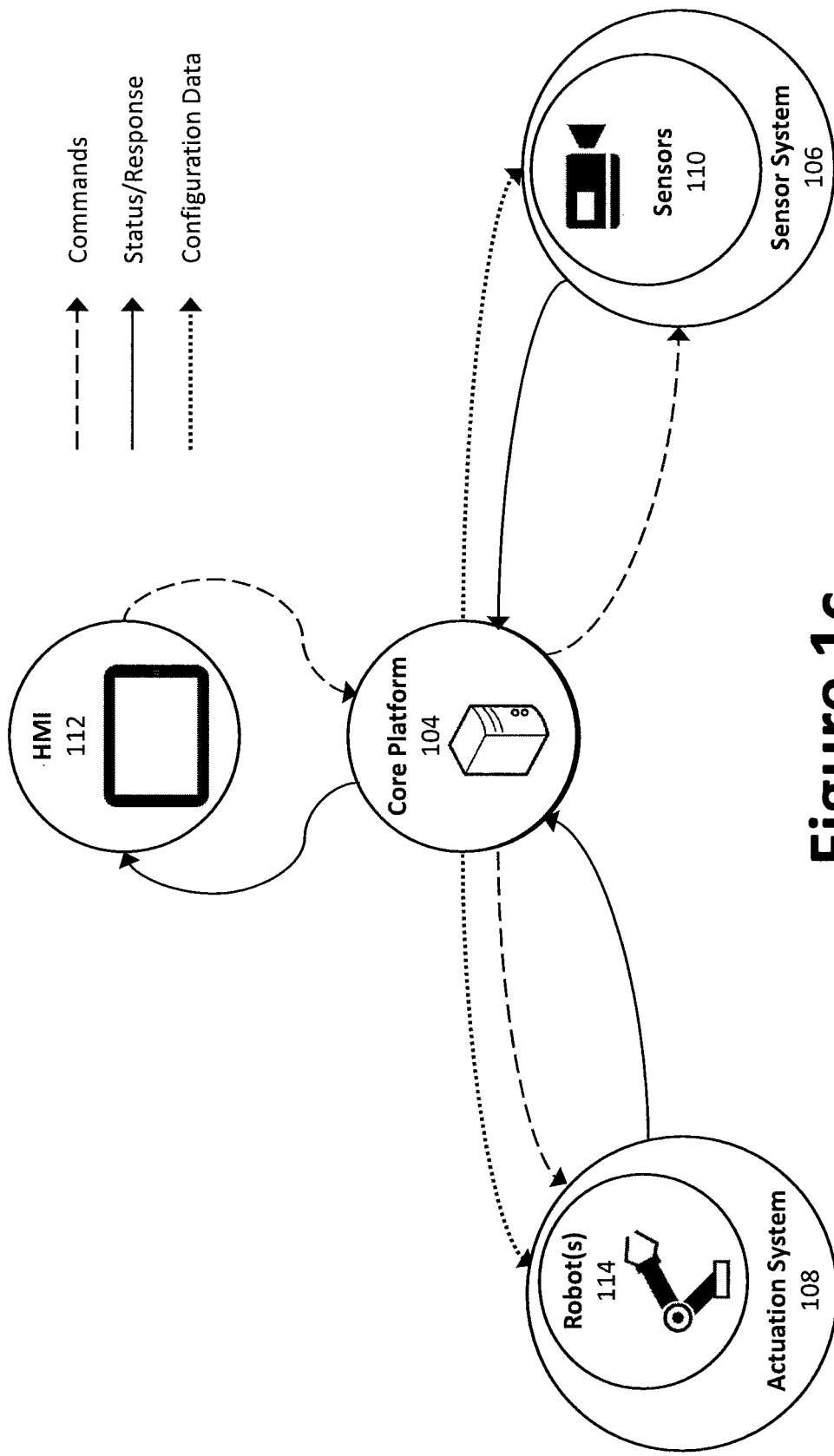

An example system architecture for an inspection automation system 100 in accordance with one aspect is shown in FIGS. 1a through 1c. As illustrated in FIG. 1a, a core platform 104 may operate as a central subsystem that connects the other subsystems via one or more interfaces. The subsystems may communicate with one another through software and/or hardware interfaces using wired and/or wireless communication protocols and hardware. For example, FIG. 1c illustrates an example flow of information (e.g., data) between the various sub systems.

The core platform 104 is operatively coupled with each of the plurality of subsystems, such as those listed below. Each of the plurality of subsystems of the inspection automation system 100 may be modular, such that the entire inspection automation system 100 can be substantially implemented on various manufacturing systems without substantial modifications. For example, the core platform 104 may be configured to communicate with multiple subsystems via one or more software and/or hardware interfaces, which may be a combination of hardware (e.g., permanent or removable connectors) and software. In certain aspects, however, the inspection automation system 100 may alternatively be integrated with a particular manufacturing system, thereby directly employing all sensors and indicators in such a system. For example, the inspection automation system 100, or components thereof, may be integrated into the manufacturing machinery at various stages of production during both design and manufacturing of a composite article.

The plurality of subsystems may include, for example, a sensor system 106, an actuation system 108, and a human machine interface ("HMI") system 112, each of which may be operatively coupled with the core platform 104. In certain aspects, the need for a sensor system 106 may be mitigated or obviated via use of an integrated manufacturing monitoring system and/or data from a computer control associated with the monitoring system. As can be expected, however, such integration would likely require a degree of modification and/or understanding of the manufacturing system, which may increase complexity. The inspection automation system 100 and/or core platform 104 may also comprise, or be operatively coupled to, a one or more databases 139 and/or a communication system 146 (e.g., via communications interface to DDS 148), as provided in FIG. 1b.

The modular configuration further enables the operator to customize use of subsystems and/or modules or to add/install additional subsystems or modules. For example, when the inspection automation system 100 is configured to provide information to the operator via the HMI 112 (i.e., without the ability to control the manufacturing process), the actuation system 108 may be removed or disabled. Accordingly, depending on the configuration, the inspection automation system 100 may be configured with fewer or additional modules, components, or systems without departing from the spirit and scope of the invention.

FIG. 1b illustrates an architecture diagram of an example inspection automation system 100. A core platform 104 may operate within computer 102 and provide, or otherwise serve as, middleware that can be made specific to a particular manufacturing system or process, or configuration through an initial transition and setup phase. In other words, the core platform 104 may provide an operating system that provides instructions and/or information to a set of operational applications (e.g., a procedure manager 134, a state manager 136, a trend manager 138, etc.) and communicate signals to one or more of a set of hardware interfaces (e.g., an HMI interface 130, a sensor interface 132), while collecting and logging the data necessary to enable those applications, such as via a Data Distribution Services (DDS). For example, DDS communication systems have the ability to regain performance levels after the introduction or removal of a DDS linked component. Such a modular system architecture is based on distributed intelligence and decentralized control of communication to provide reconfiguration of industrial robots in manufacturing facilities. Thus, the result is part of a system architecture that focuses on maximizing the efficient use of mobile industrial robots during production runs, such as manufacturing of composite articles as described herein.

As shown, the core platform 104 serves as the primary autonomous agent and decision-maker, which synthesizes inputs from the sensor system 106 and HMI system 112 with its acquired knowledge base to determine the overall system state. The core platform 104 may process inputs from the various sensor suites and aggregate the resultant information into an understanding of current state of the manufacturing process and/or the composite article. The resultant information may be compared against a composite specific file. For example, the procedure manager 134 can provide a breakdown of the various steps and/or stages in the specific manufacturing process. The state manager 136 can identify the presence of defects, such as by comparison of stored data with data acquired via one or more sensors 110 (e.g., sensors 110a-d), and generate an estimation of the state of the composite article at various stages of the manufacturing process.

Additionally or alternatively, the trend manager 138 can capture and analyze data from the sensor system 106 to build a library or matrix of values associated with characteristics of a composite article that define a measure of quality. For example, the trend manager application 138 provides trend analysis developed using machine learning based on, for example, data acquired via the sensor system 106. For example, the trend manager 138 can "learn" which data correspond to a characteristic of the manufacturing process or article (e.g., a measure of density can represent a bubble/void in a resin application; appearance of overlapping or gaps in a layered composite can represent a flawed process; etc.), and identify data from the sensor system 106 that corresponds to a defect. In certain aspects, the trend manager application 138 may supply data to, or otherwise trigger, the state manager 136 to identify a defective state. For example, if the trend manager application 138 detects an undesirable trend, the trend may be flagged as an anomaly and reported to the state manager 136.

The core platform 104 can host various software processes that track the composite article through the stages of manufacture, as well as any modules for trend analytics (e.g., the trend manager 138, configured to predict and/or aid in identification of defects) and machine learning routines (e.g., deep learning, application of neural networks, etc.). The inspection automation system 100 may further generate a log of a given manufacturing stage and/or process for later analysis and/or building a trend database, which may be used to provide data for the trend manager 138. The logs may be used in connection with, for example, quality assurance analysis, system analysis, etc.

The core platform 104 outputs may be used to provide messages to the HMI 112. The messages may indicate, for example, checklist progress, identification of defects, warnings to adjust a process, etc. The information can be transmitted to, or to HMI 112 via an HMI interface 130. The resultant state knowledge and associated recommendations can be passed to a human operator via the HMI 112 or, in certain aspects, to the actuation application 108 for correction via one or more robotic systems 114 to enable an autonomous response. In some examples, an operator via HMI 112 can initiate one or more actions within the system 100, such as to control the robotic system 114 via the actuation system 108.

FIG. 1b shows a system level architecture for a manufacturing quality control scheme. As shown, the core platform 104 serves as the central subsystem, or interface, of the inspection automation system 100, connecting and controlling the remaining subsystems (e.g., as individual applications) in an open architecture. The remaining subsystems include, for instance, the HMI 112, the actuation systems 108 (e.g., to provide autonomous operation via robotic system(s) 114 when desired), the sensor system 106 (e.g., to provide data), and other subsystems. Thus, control of the inspection automation system 100 hardware may be provided via separate applications specific to a particular piece of hardware.

In certain aspects, the inspection automation system 100 and/or core platform 104 may employ a computer bus and application (e.g., as an interface) that facilitates discovery of a hardware component of a subsystem within the inspection automation system 100 without the need for physical device configuration or user intervention in resolving resource conflicts. Such a configuration may be referred to as "plug and play." Thus, an operator may readily add or remove systems or subsystems (e.g., as modules) to the system 100 via the core platform 104 without requiring substantive modification or integration efforts.

In this manner, the core platform 104 receives data regarding the manufacturing process and/or the article being manufactured, enabling the core platform 104 to develop a complete understanding of the system. The data may be populated by the sensor system 106, which provides information about the manufacturing system in use (e.g., operational stages, state of the composite article, etc.), and other subsystems or sensors. The information can be stored in a data store 139, populated and adjusted to a specific manufacturing process and/or article. For example, data captured during trend analysis can be stored and updated as needed.

The core platform 104 can combine information with data from a set of internal state sensors, which also improve redundancy and system robustness, thereby allowing the inspection automation system 100 to generate a highly accurate estimate of the composite article's state and system statuses, and to identify deviation from expected results. During manufacturing operations, the data store 139 is dynamically updated with real-time data gathered by, inter alia, the inspection automation system's 100, the sensor system 106, the HMI 112, as well as the state manager 136. Once the data store 139 for a given procedure/product is populated, the data store 139 can be retained in a library or matrix and used for other similar procedures/products for which the inspection automation system 100 is monitoring.

The state manager 136 employs machine-learning techniques to monitor a state of the manufacturing process and the composite article, and to classify sensor inputs in order to detect the presence of non-normal situations (e.g., a fault in the machine, a defect in the composite article, etc.), and to identify at which stage of the process the issue has occurred. The state manager 136 is configured to compare the sensed data against a set of thresholds defined in the procedure manager 134 and/or the trend manager 138 for the specific manufacturing process (e.g., size of a void, distance of a gap, etc.). The state manager 136 may also compare the sensed states against additional information available to the inspection automation system 100 (e.g., from an operator via the HMI 112, from a networked information source, etc.) and generate alerts or other messages in response to meeting predetermined or dynamically determined thresholds (e.g., warning thresholds, etc.).

In the case when a defect or anomaly is detected, the procedure manager 134 executes one or more predetermined or dynamic checklists, procedures, and actions in order to maintain consistent quality in the manufactured composite articles. Notably, if a departure from expected performance is observed, the operator can be alerted to the presence of a defect, thereby mitigating or avoiding follow-on damaged products. For example, if a particular material, process, etc., is susceptible to a particular type of error (e.g., sensitivity to environmental conditions, temperature, etc.), the inspection automation system 100 can identify the presence of such conditions and generate warning (e.g., via HMI 112) and/or commands (e.g., via actuation system 108) to mitigate such events.

The various information pertaining to the operational applications are communicated between the actuation system 108, the sensor system 106, the HMI 112, and other subsystems via, for example, the HMI interface 130, and sensor interface 132. Additionally, the HMI 112 contains an interface to the DDS 122, the sensor system 106 includes an interface to the DDS 140, and the actuation system 108 includes a robot application interface 109, to communicate with the core platform 104 via the DDS.

As illustrated, the sensor system 106 may comprise a sensor application 142 to collect and analyze data from one or more sensors 110*a-d*, such as optical coordinate measuring machine 110*a* (for visual inspection), thermal camera 110*b*, non-contact ultrasound (NCU) 110*c* and/or ultrasound inspection 110*d* (used for acoustic inspection), and/or other sensors as needed to identify defects in the process, machines, and/or the composite article. The sensor system 106 may employ a monocular or stereovision system, possibly including motion capture markers, to continuously monitor the state of the process by imaging the composite article, the and/or reading what is displayed on the cockpit instruments.

In certain aspects, by comparing information about a scene from two vantage points, 3D information can be extracted by examining the relative positions of objects in the two panels. Using a stereovision system and/or markers also provides sensing that may prevent collisions between robotic components, etc.

When desired, an actuation system 108 executes the actions commanded via the core platform 104 to guide the composite article through the manufacturing operation. The actuation system 108 executes the actions commanded by the core platform 104 to aid in monitoring the progress of a manufactured article and to identify defects therein, including at which stage the defect appeared. As illustrated in FIG. 1*b*, for example, the actuation system 108 may receive actuation commands and configuration data from the core platform 104, while sending to the core platform 104 information such as feedback regarding the actuation system's 108 actions.

The HMI 112 provides a control and communication interface for the operator. The HMI 112 is configurable to operate as a process manager that enables the operator to direct the inspection automation system 100. The HMI 112 may include a human-machine interface, which may be based on a touch screen graphical user interface ("GUI") and/or speech-recognition systems. The HMI 112 may employ, for example, a tablet computer, a laptop computer, a smart phone 116, or combination thereof. A voice application 126 can receive information from an operator via speakers 120. The HMI 112 may be located remotely from the manufacturing system or, in certain aspects, employed as an integrated display with the manufacturing system (e.g., an existing display).

As illustrated in FIGS. 1*b* and 1*c*, the HMI 112 may employ a tablet based GUI and an HMI application 124 configured to send and/or receive information between the system 100 and an operator. An objective of the HMI 112 is to enable the operator to interact with the core platform 104 to make informed decisions during the manufacturing process (e.g., modify or halt operations based on a detected defect). As illustrated in FIG. 1*b*, for example, the HMI 112 may receive status information from a subsystem via the core platform 104, while sending to the core platform 104 mode commands generated by the HMI 112 or input by the operator. The operator may be remote (e.g., monitoring from a consolidated area) or present at the manufacturing device. Thus, in certain aspects, the HMI system 112 may be remotely facilitated over a network via a communication system 146.

The HMI 112 can display the current state of inspection automation system 100 (i.e. the current stage and/or the state of the composite article) as well as which operational applications are currently installed, which operational applications are running and, if they are active, which actions the actuation system 108 is taking. In some examples, the HMI 112 provides an intuitive display and interface that includes checklist verification and/or alerts from the core platform 104, including predictions of the manufacturing stage and composite article state, such as defect prognosis and deviation alerts. Thus, when the operator views the HMI 112, the operator may review and monitor checklist items, as well as review any alerts. The HMI system 112 may give visual and auditory alerts to direct the operator's attention to checklist items.

The state manager 136 collects, determines, or otherwise perceives the real-time state of the composite article. As noted above, the state manager 136 may perceive the real-time state through, inter alia, a direct connection (e.g., integral with or otherwise hardwired) to the system 100, or via sensor system 106. When a sensor system 106 is used, the state manager 136 may include a dedicated controller (e.g., processor) or share the controller (e.g., sensor application 142) of the sensor system 106.

The data perceived by the sensor system 106 may be encoded and provided to the core platform 104 in real-time. The open architecture of the core platform 104 enables the incorporation of additional data received via a data bus or DDS to augment the situation data generated by the sensor system 106. As illustrated in FIG. 1*b*, for example, the state manager 136 and/or the sensor system 106 may receive commands and configuration data from the core platform 104, while sending to the core platform 104 status and situation information (e.g., defect data) gathered by the sensor system 106 or otherwise collected by the state manager 136.

In some examples, the state manager 136 applies one or more machine-learning algorithms to the captured data to determine a state of the manufacturing process and/or state of the composite article. By supplementing a physics-based approach to data analysis with machine-learning techniques, the system 100 advances the state of the art without relying on the advancement of computational complexity. Additionally, computational based approaches have a tendency to make significant assumptions within the physical models, which may influence results. A neural network based approach, as described herein, will learn to mimic the inspection habits of a human operator, and place weighted values on characteristics of interest to a human inspector.

In particular, artificial neural networks (ANNs) are computing systems inspired by the biological neural networks that constitute animal brains. Such systems "learn" different tasks by observing examples. In some cases, a system employing an ANN is not programmed for a specific task, but the system is able to recognize patterns and employ learned techniques in later tasks. For example, in image recognition, the system learns to identify images that contain a particular object by analyzing example images containing the object, and performing analytics to identify the object in other images. ANN systems have been employed to replace the limited scope of traditional computer algorithms using rule-based programming.

The state manager 136 gathers and/or generates a knowledge base necessary to enable the inspection automation system 100 to determine information specific to the composite article being manufactured. This includes knowledge of manufacturing performance characteristics, composite material characteristics, checklists, and procedures that define quality in a manufactured composite article. The data may be derived from a combination of data (e.g., from manuals, operator input, etc.) and data acquired during manufacturing (e.g., via sensors 110a-d), which supports machine learning and trend analysis. Machine learning enables the knowledge acquisition process to be performed efficiently and quickly.

The process specific information may be gathered during one or more training periods using (e.g., in order to build a base of knowledge for the machine-learning algorithms, etc.) as well as through direct monitoring of manufacturing operations. The output of this process is built into a library or matrix of historical data, including expected performance and potential issues specific to a particular process and/or article, which can be stored in the data store 139, the state manager 136, and/or the trend manager 138, which are described above with regard to the core platform 104. Contained in this data store 139 may be operational procedures, available systems and their designs, and all other information necessary for effective operation of the manufacturing system.

The system is configured to perform an example five-step process, which includes in-situ inspection steps at the layup stage, the cure stage, and the trim stage. In particular, the layup stage performs a NCU inspection; the cure stage performs an in-situ validation, whereas the trim stage employs in-situ NDI. Thus, at each of these stages, a separate inspection protocol is employed. This generates data to identify defects after a particular stage of the manufacturing process, data that can be used to alert and/or inform an operator or system manager, as well as take action to correct such defects (e.g., adjust a parameter of the manufacturing process).

In some examples, the state manager 136 analyzes data of characteristics corresponding to integrity of a composite article at different stages of the process. For instance, after a layup process is performed, an in-situ non-contact ultrasound can be performed. The automated defect inspection can be applied to the material to identify wrinkles, folds, foreign objects, bubbles, voids, etc. Information regarding the inspection can be provided to the core platform for analysis, tracking, display for a human operator, etc.

Additionally or alternatively, data can be analyzed after curing the composite article. For instance, the after the composite article is heated and cured, an in-situ validation process is performed to determine is a defect is present (e.g., wrinkles, folds, foreign objects, bubbles, voids, etc.). If a defect is identified, at either stage an alert can be sent and/or information can be sent to an automated manufacturing tool.

Additionally or alternatively, the defect value associated with the characteristic can be compared to a plurality of defect values (e.g., one or more threshold values stored in data store 139). For example, the stored values can be stored in a library or matrix, and learned and/or updated via a trend analysis manager (e.g., trend manager 138). If a defect is identified in the composite article (e.g., via the state manager 136), an alert can be presented to a human operator (e.g., via HMI 112) and/or presented to an actuation system (e.g., actuation system 108) to adjust an operation of the manufacturing process. In some examples, the state manager 136 designates the manufactured article as containing a defect and can be singled out for further inspection, destruction, etc.

Thus, the systems and methods described herein are configured to capture sensor data from a variety of sources, consume and analyze the data in real-time to validate a quality measure for one or more characteristics of the composite article. Therefore, the quality of the potential output can be assessed at multiple stages before a final product is delivered. This is achieved by sensing characteristics of the manufacturing process and/or composite article, analyzing the data via machine learning techniques, identifying a defect and/or stage at which the defect arose, and communicating the information to an HMI and/or a robotic actuation system to mitigate an issue prior to proliferation of the issue.

Figure 2A:
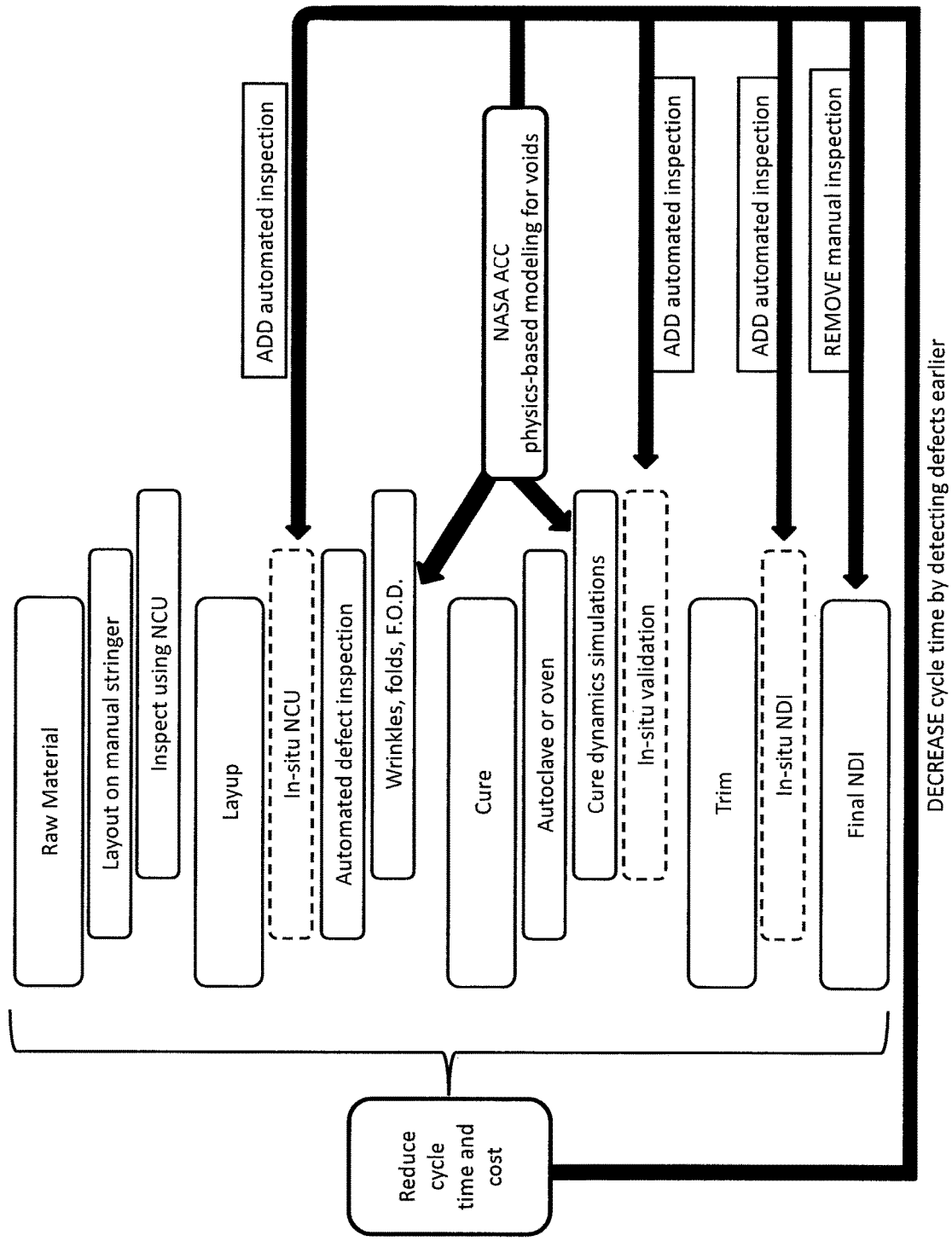
FIG. 2a illustrates an example process overview.

FIG. 2a illustrates an example process overview. The process includes five main stages: 1) raw material acquisition; 2) material layup application; 3) curing the material; 4) trimming a cured article; and 5) final NDI, which include a final inspection. Each process contains one or more subprocesses.

As shown in the example of FIG. 2a, the conventional process is improved upon by incorporating an automated inspection step in-situ at various stages to capture and analyze data to determine if defects are being generated and at which stage. As shown, and described in detail, infra, each stage can be individually analyzed, including by one or more sensors and/or machine intelligence algorithms, to identify defects during the manufacturing process. By contrast, conventional processes relied on a single inspection step after the composite article was completed. At that stage, the article itself would be scrapped. Further, if the defect was introduced at an early stage in the process, even as a defect on the first such damaged article is discovered, any number of trailing articles could have been impacted by the same defect before the issue can be corrected.

By use of the presently disclosed system, early detection and analysis of defects, and the stage in which they occur, is achieved. In turn, defects to the manufacturing process can be addressed before multiple articles are affected. Such a response will limit the amount of raw materials needed, limit downtime due to identification of problems within the manufacturing process, and reduce the number of discarded articles that have completed the manufacturing process, for instance. Further, by employing automated inspections throughout the process, manual inspections upon completion of the article can be limited or eliminated, which will help decrease cycle times and improve quality control.

Figure 2B:
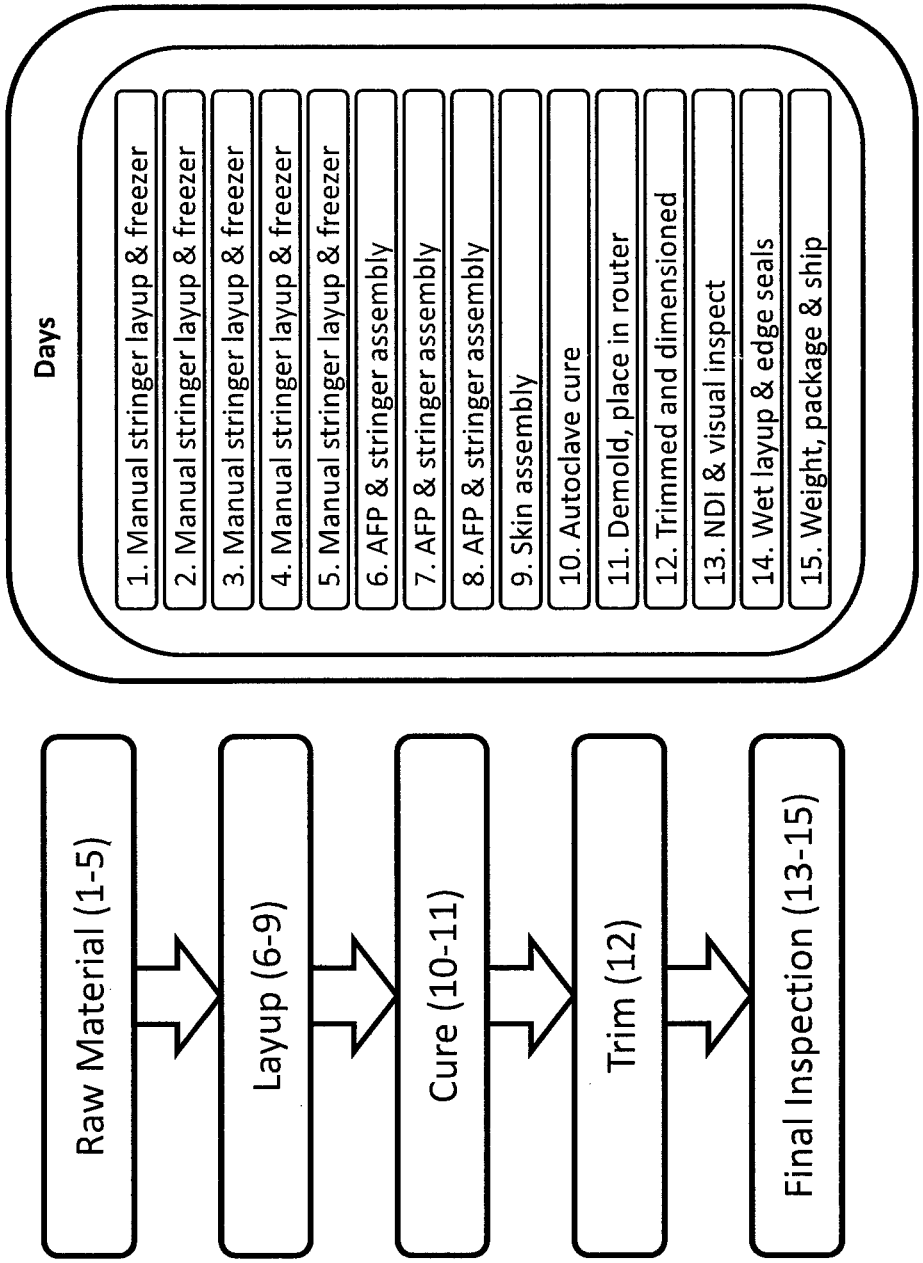
FIG. 2b illustrates another example process overview.

FIG. 2b illustrates another example process overview for manufacturing a composite article. In the example of FIG. 2b, the raw material stage is represented as processes 1-5, the layup stage is represented as processes 6-9 stage is represented as processes 10-11 stage is represented as process 12, and the final stage is represented as processes 13-15. The in-situ inspection process has yet to be incorporated.

As shown in the example of FIG. 2b, the raw material stage may include five steps of employing a manual stringer layup and a freezer, which may be used to cool and extend the life of the raw material. For example, stringers and skin structures cooperate to provide flexural and torsional stiffness to various sections of a product (e.g., a skin of an aircraft). The layup stage may include three steps of automated fiber placement (AFP) and stringer assembly, and a step of skin assembly. The cure stage includes an autoclave curing step and a demold step, with the cured article being placed in a router. At the trim stage, the composite article is trimmed and dimensioned to suit its particular purpose. During the final inspection stage, a nondestructive inspection (NDI) action is applied to the composite article, and then visually inspected. The wet layup molding process is performed, such that layers of reinforced fiber are combined with liquid resin to create a high quality laminate. This process can include placement of reinforcement material into and/or against a mold in different layers. The edges of the manufactured article are then sealed, and the final product may be weighted, packaged, and shipped.

Figure 3A:
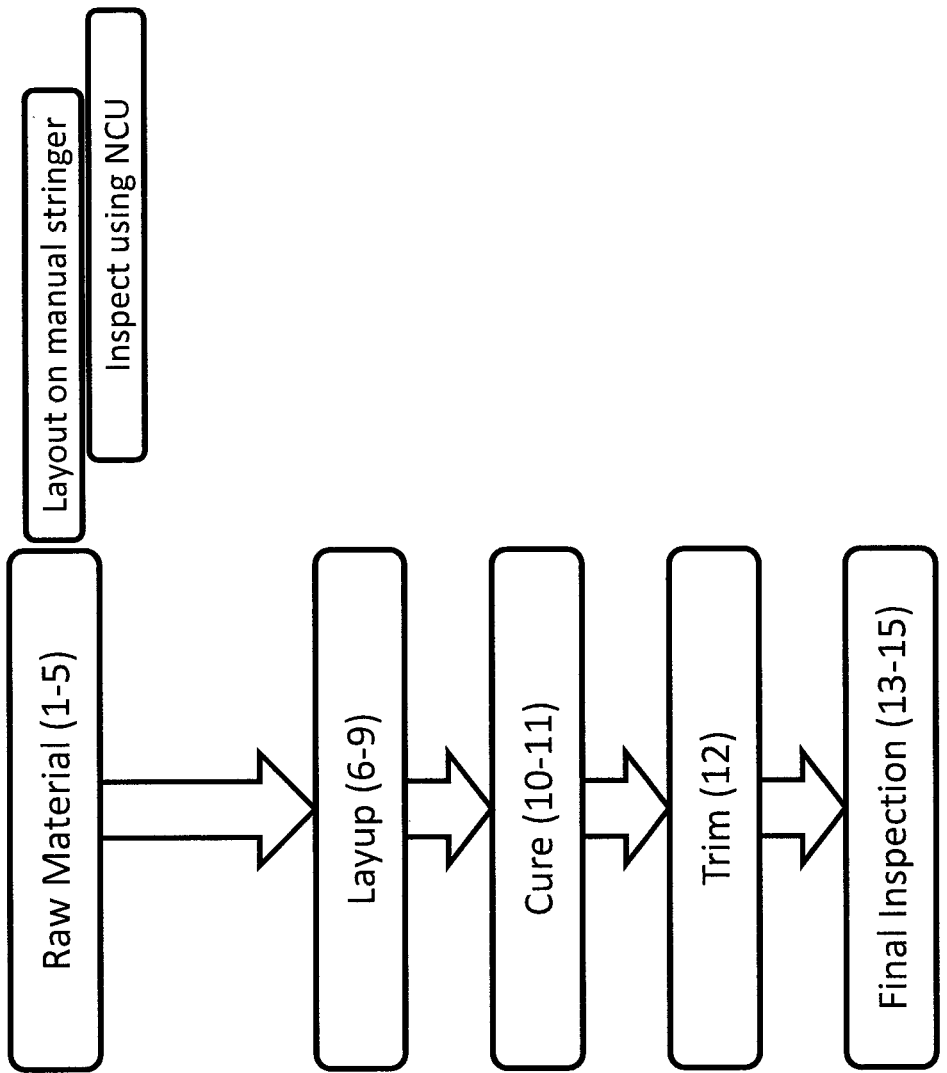
FIG. 3a illustrates detail of an example raw material process.
Figure 3B:
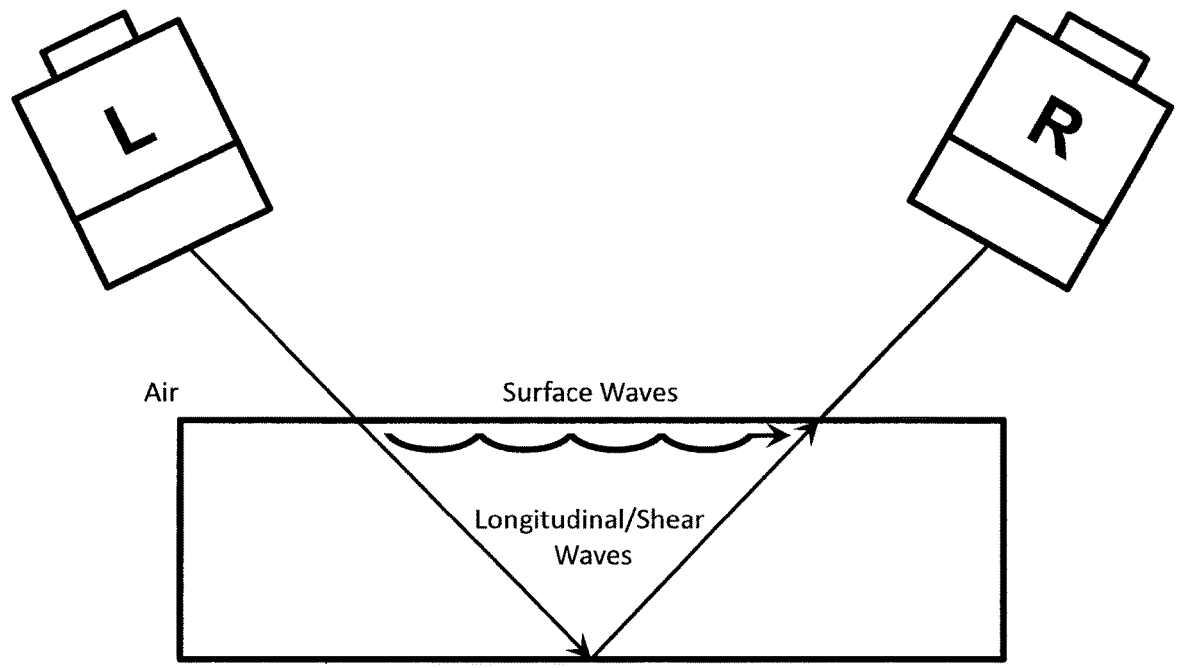
FIGS. 3b to 3d illustrate example elements of a non-contact ultrasound inspection.
Figure 3C:
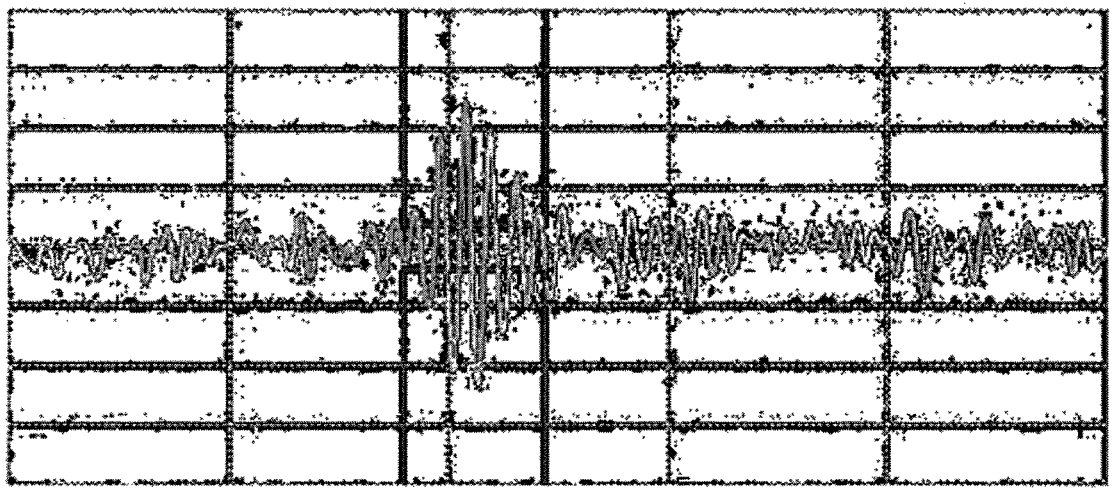
Figure 3D:
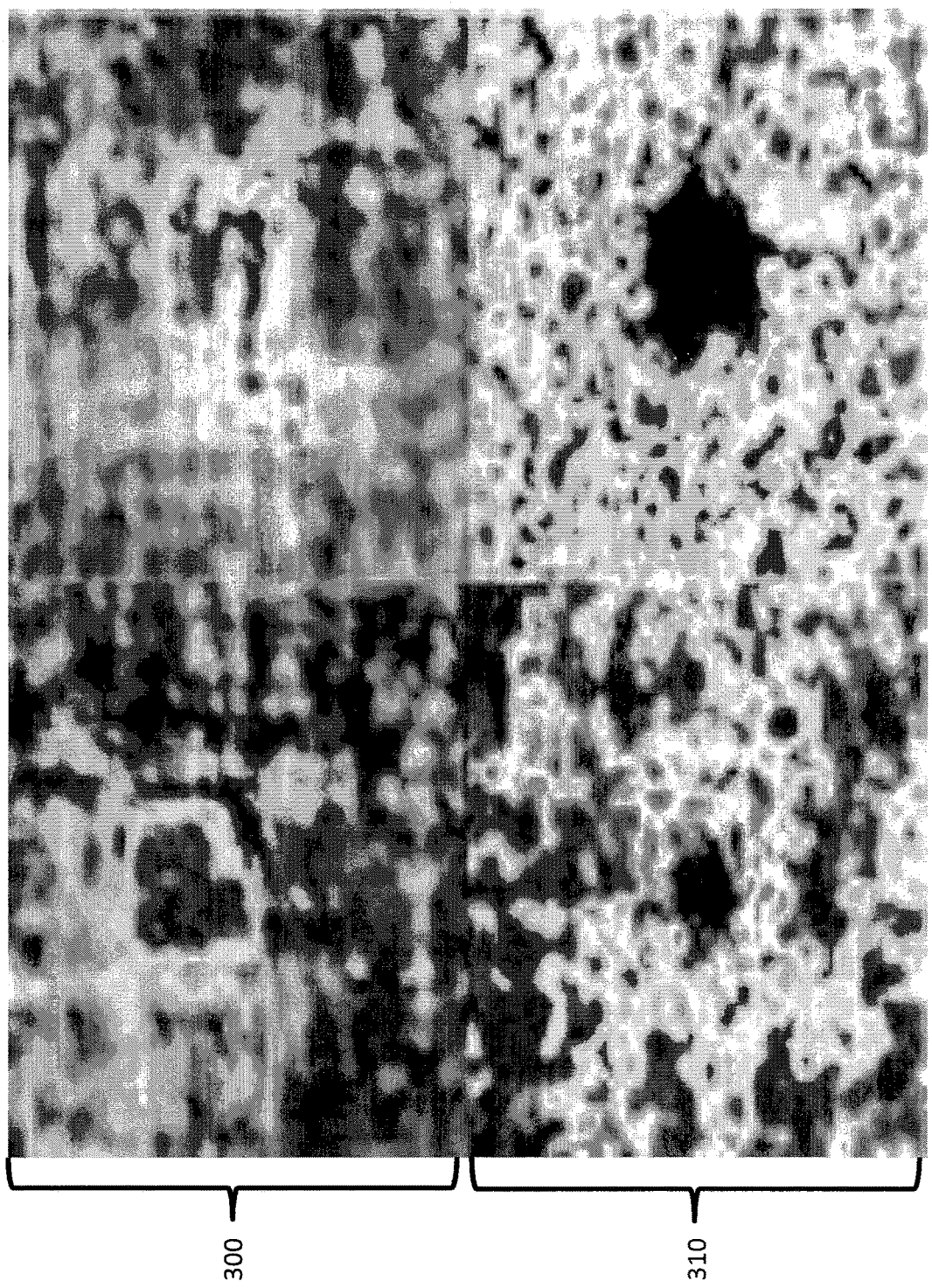

FIG. 3a illustrates detail of an example raw material process. For instance, the raw material is prepared on a manual stringer to provide form and structure for the composite article. The result is then inspected using a non-contact ultrasound. Suitable non-contact ultrasound equipment is currently manufactured by the Ultran Group. As further illustration, FIGS. 3b to 3d provide example elements of a non-contact ultrasound inspection. FIG. 3b shows a transmitter L, which provides ultrasound waves through a medium, to be received by a receiver R. Based on the characteristics of the transmitted and received waves, a determination can be made of one or more characteristics of the medium. FIG. 3c illustrates a graphical representation of the waves interacting with the medium, whereas FIG. 3d shows a result of NCU imaging. For example, the top portion 300 illustrates a 1.5 mm CFRP prepreg with trapped protective papers at 500 kHz, whereas bottom portion 310 illustrates 4.0 mm CFRP prepreg with trapped protective film at 200 kHz.

Figure 4A:
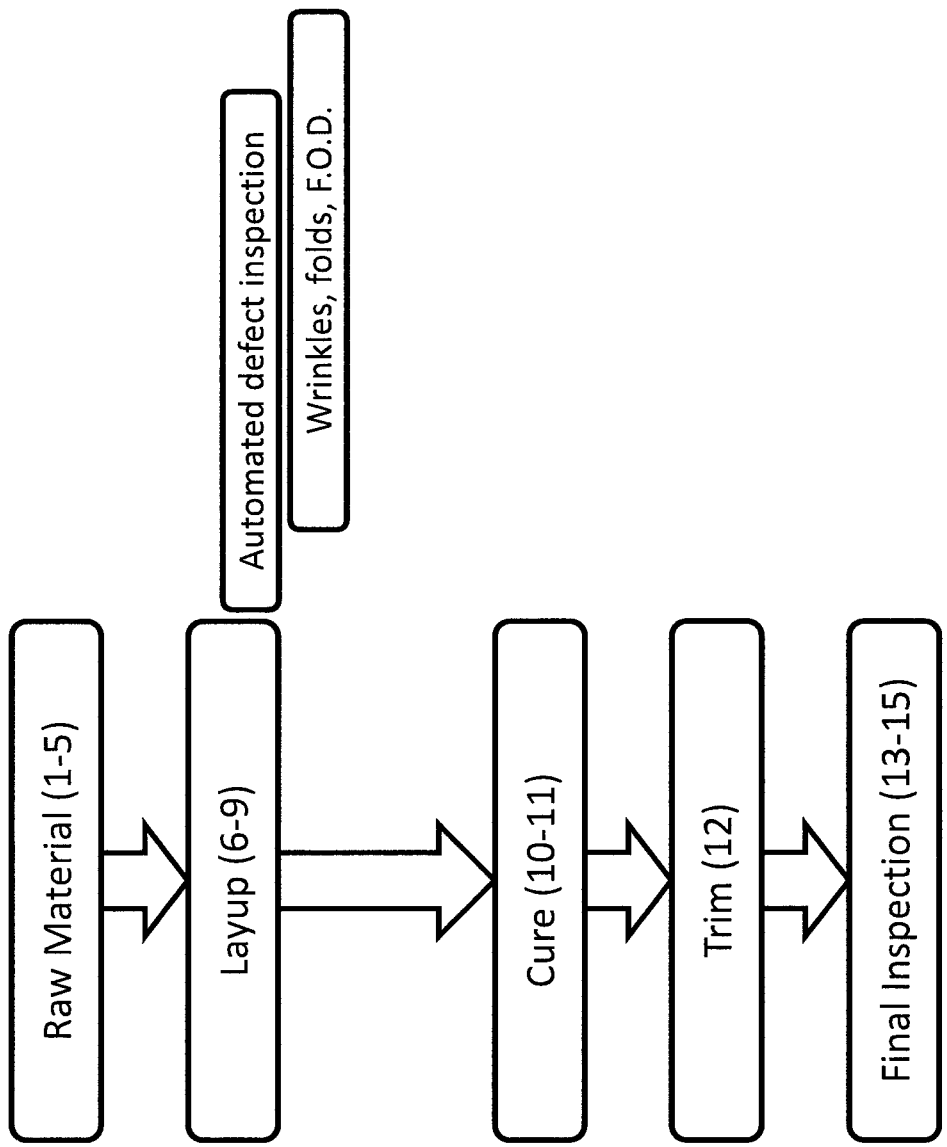
FIG. 4a illustrates detail of an example layup process.

FIG. 4a illustrates detail of an example layup process. For instance, an automated defect inspection is performed to identify the presence of wrinkles, folds, and/or foreign object damage (FOD) in the composite.

Figure 4C:
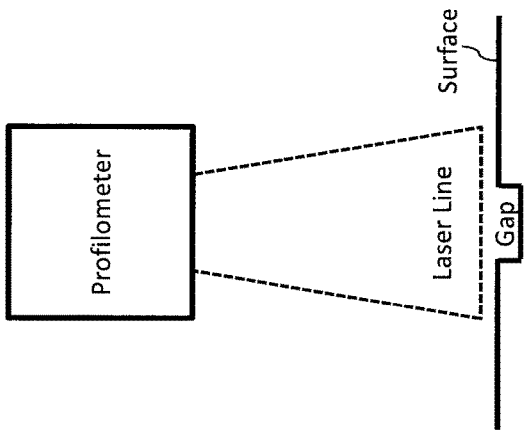
FIGS. 4b through 4d illustrate example elements of a laser implemented inspection system.
Figure 4B:
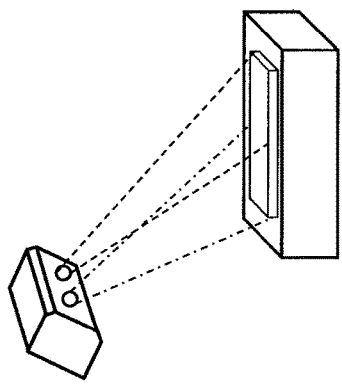
Figure 4D:
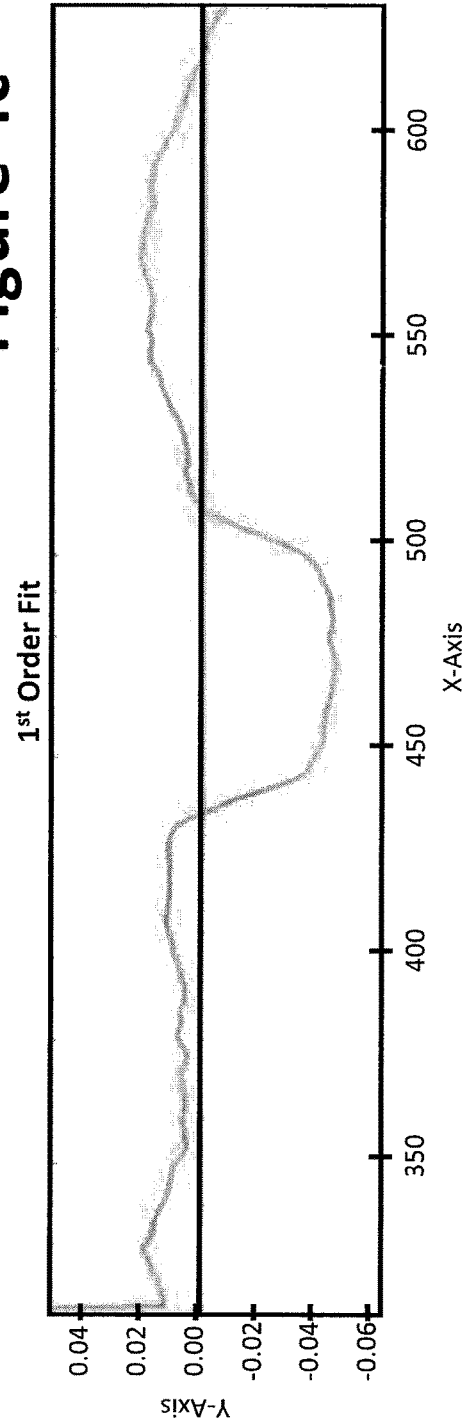

FIGS. 4b to 4d illustrate example elements of a laser implemented inspection system. In an example, the inspection system can be the LASERGUIDE system manufactured by Assembly Guidance Systems Inc. FIG. 4b illustrates a laser triangulation implementation on a manufactured article, where the laser inspection system performs calculation (e.g., executes algorithms) to identify an object. FIG. 4c illustrates the use of a laser implement profilometer (e.g., a measuring instrument to measure a profile of a surface) to identify a gap in a surface of an object via a laser line applied to the surface. FIG. 4d provides a graphical representation of the captured data, which indicates a negative value corresponding to the gap.

Figure 5A:
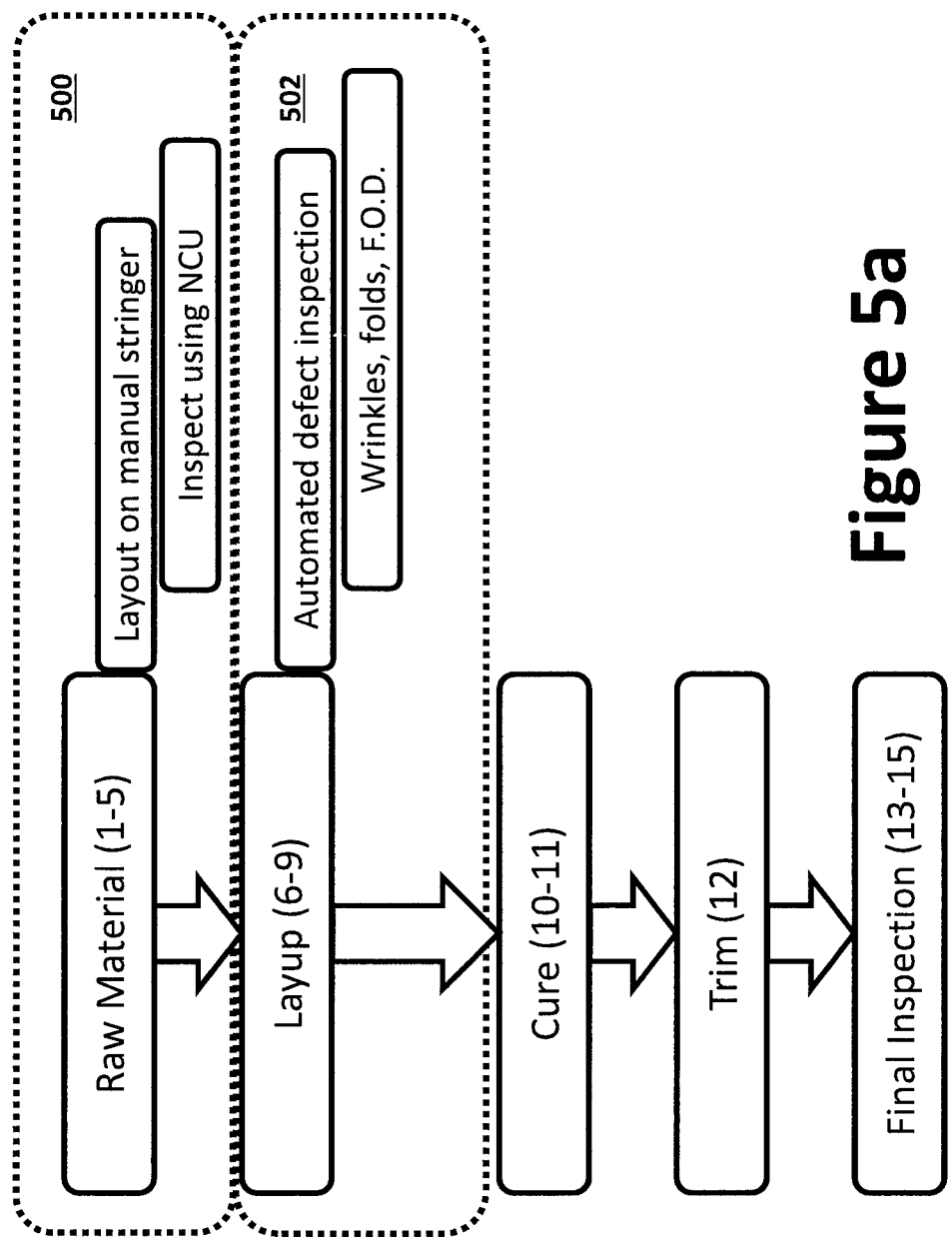
FIGS. 5a and 5b illustrate detail of an example inspection process.
Figure 5B:
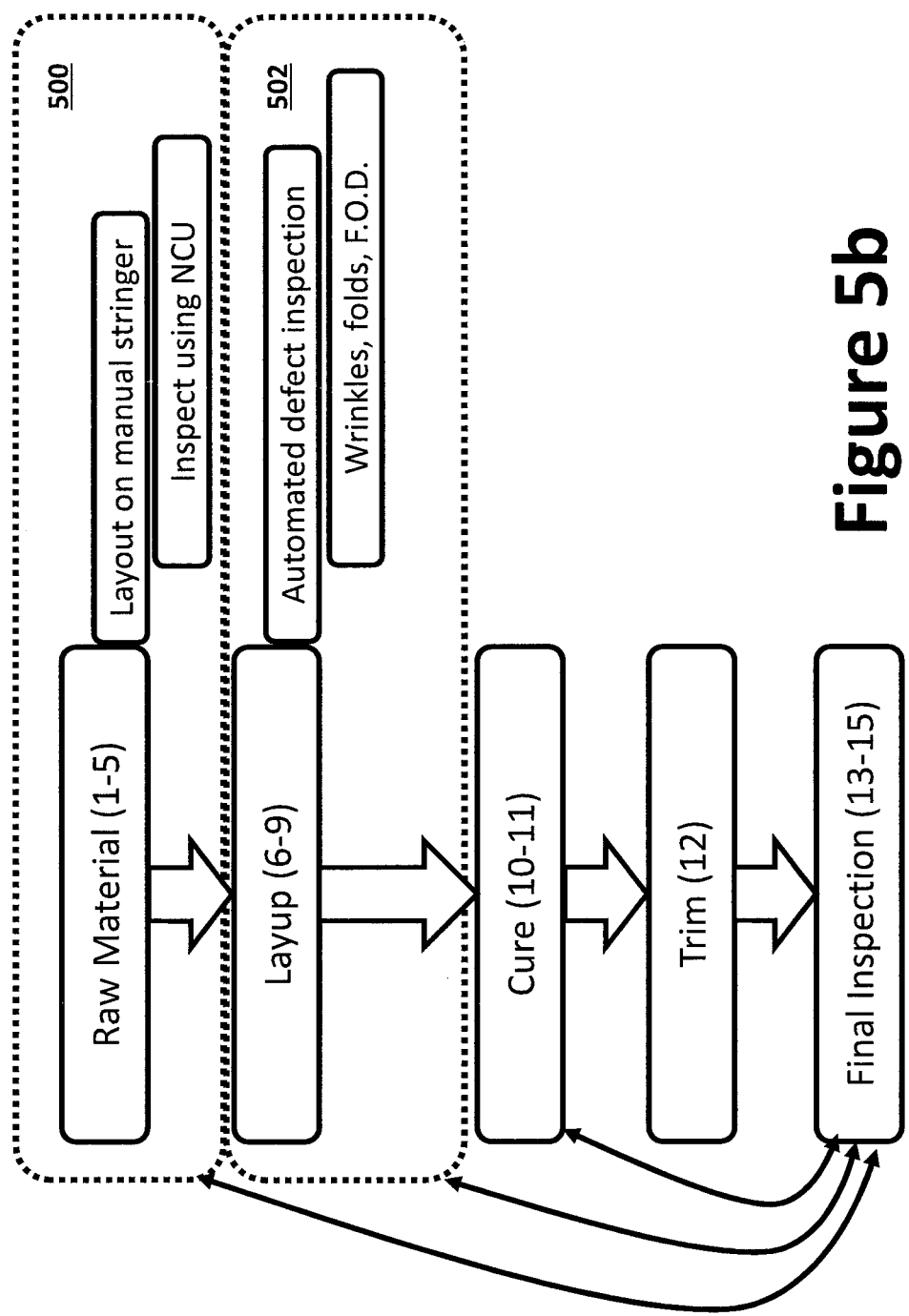

FIGS. 5a and 5b illustrate detail of an example inspection process. In the example of FIG. 5a, the deficiencies of conventional systems are identified as only providing in process inspection for the quality of the raw material for manual layup, or if the composite raw material was laid down properly in accordance with Automated Fiber Placement (AFP). FIG. 5b illustrates the lack of inspections prior to the final inspection stage. AFP, also known as advanced fiber placement, is a method of manufacturing composite materials. For instance, composite materials are lightweight yet offer equivalent or greater strength than metals. Composite materials are increasingly used in industries where strength and weight are controlling factors, such as in aircraft manufacturing.

For example, an AFP process places materials on molds or mandrels to provide a structural frame on which to form composite layups, such as by applying a number of layered material on the frame. This technique provides precision and increased deposition rates. Automated fiber placement is used to manufacture complex structures that are impractical or impossible to manufacture otherwise.

Figure 6A:
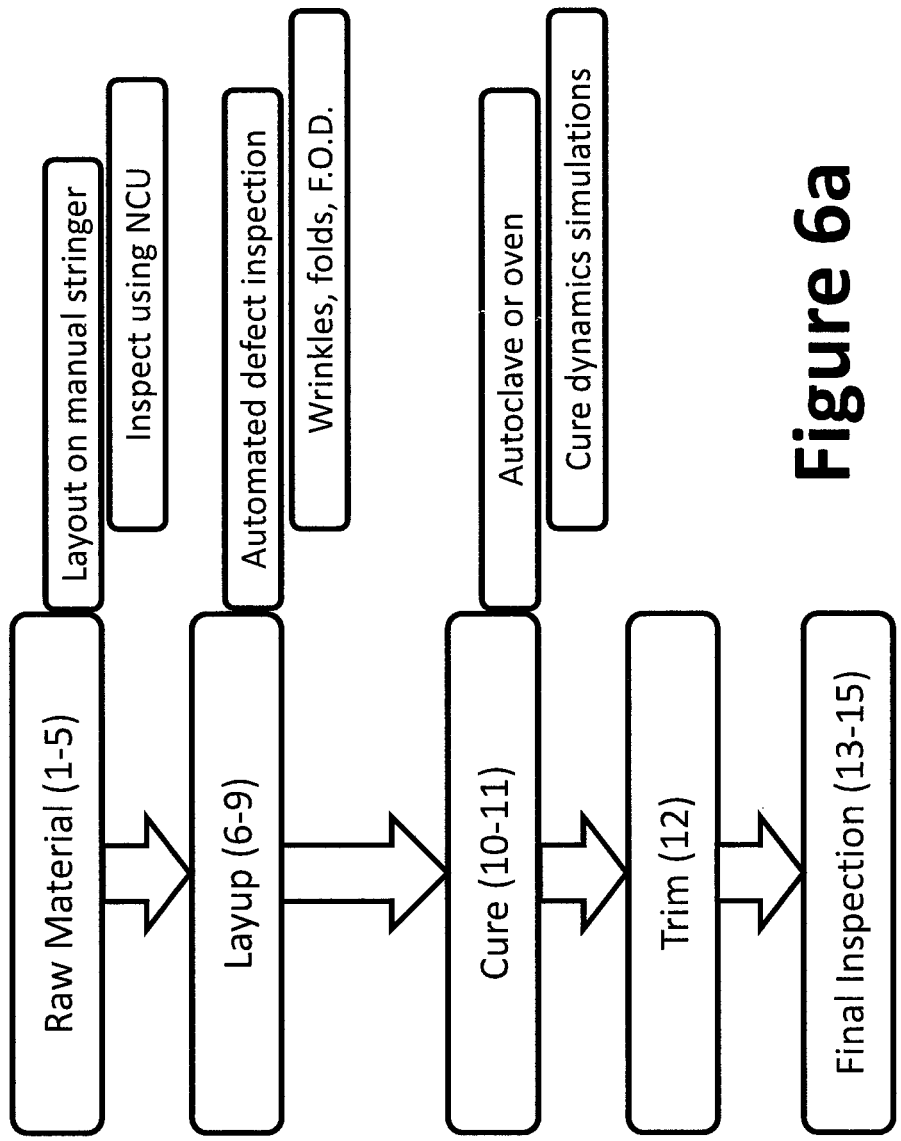
FIG. 6a illustrates detail of an example cure process.

FIG. 6a illustrates detail of an example cure process. For instance, the cure process can be performed in an autoclave or oven. For instance, curing a composite article is typically a heat-activated process taking place in an oven, autoclave, etc. The curing process can change the chemical properties of the material (e.g., resin) used to create the composite, resulting in a stronger finished product, yet having a customizable structure, as described herein.

Figure 6B:
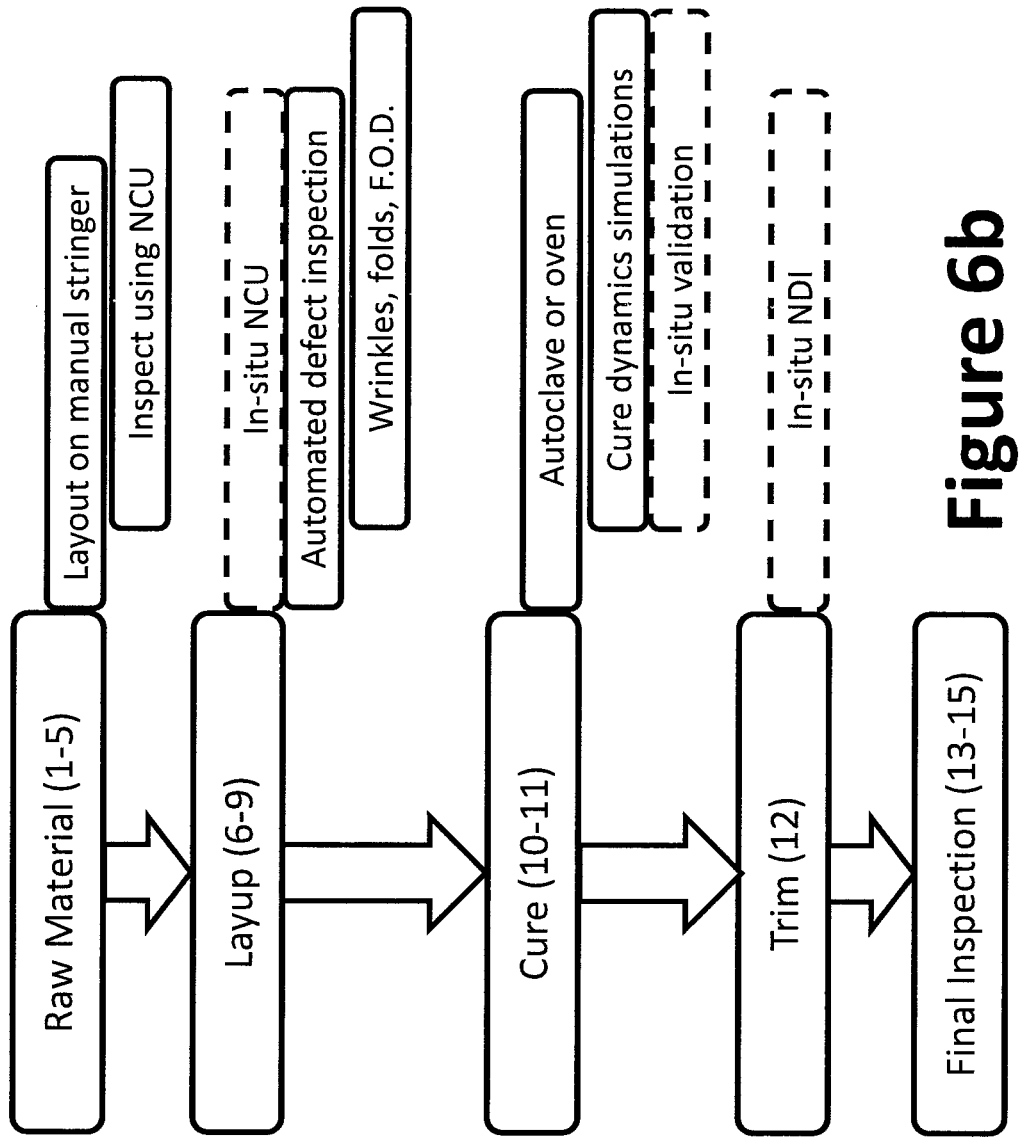
FIG. 6b illustrates detail of an example trim process.

FIG. 6b illustrates an example five-step process, which includes in-situ inspection steps at the layup stage, the cure stage, and the trim stage. In particular, the layup stage includes a NCU inspection, the cure stage performs an in-situ validation, whereas the trim stage includes in-situ NDI. Thus, at each of these stages, a separate inspection protocol is employed. This generates data to identify defects after a particular stage of the manufacturing process, data that can be used to alert and/or inform an operator or system manager, as well as take action to correct such defects (e.g., adjust a parameter of the manufacturing process).

Figure 7A:
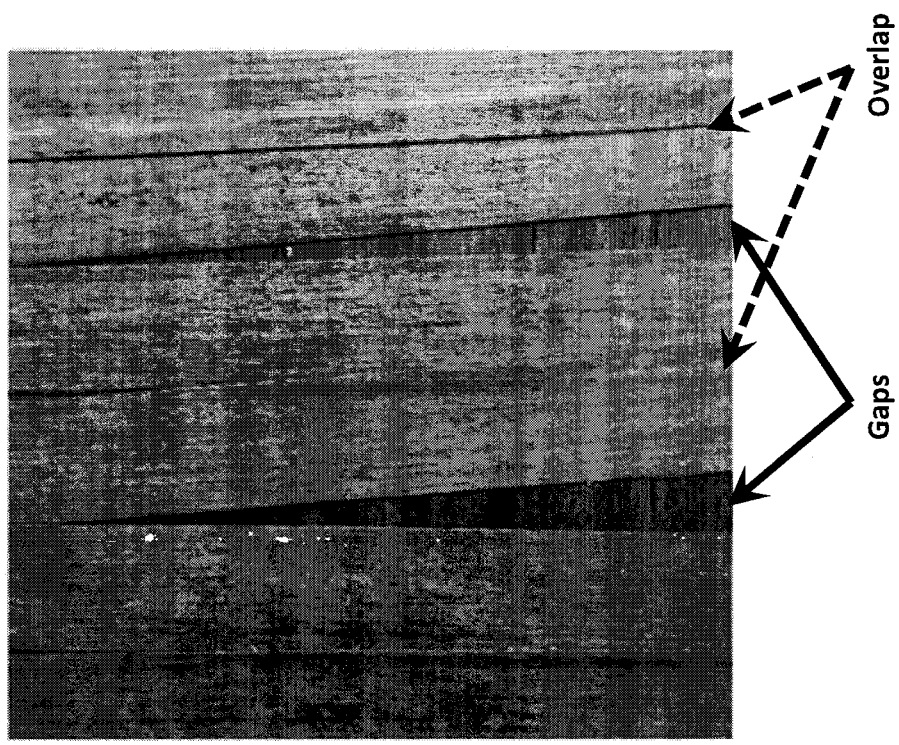
FIG. 7a illustrates an example display of defects.
Figure 7B:
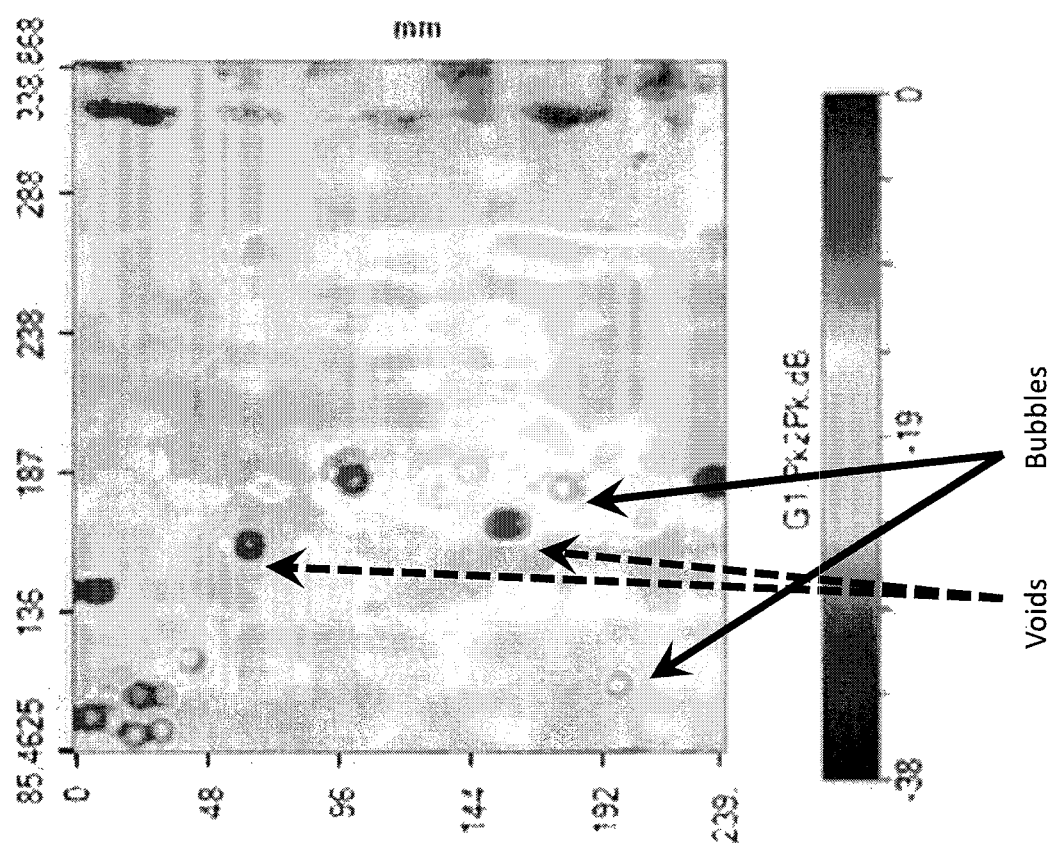
FIG. 7b illustrates example defects in a composite article.

In a conventional manual inspection, a human operator usually employs a testing platform (e.g., a CNC router) to move a sensor (e.g., NCU) over a finished composite article. The human operator moves the machine over the composite, scanning for troublesome regions, and makes a decision as to whether voids and/or bubbles in the composite article, as show in FIG. 7a, are within a threshold value and suitable for use. FIG. 7b illustrates example defects in a composite article. For example, material layers can overlap, leaving gaps in a layer exposing layers beneath. Such defects result in a weakened composite where, too often in conventional processes and systems, such defects would go unnoticed until the composite article has completed the manufacturing process. Thus, advantages of the presently disclosed system and process include early detection and attention to the manufacturing steps that caused such defects.

A robotic system can be used in the inspection process (i.e. versus manual inspection), however a human operator/inspector is typically still required due to the limited data capture and analysis generated during the manufacturing process. The present invention, by contrast, can eliminate the need for a human operator by improving in-situ inspection protocols, analyzing the data in near real-time and providing detection of defects and actionable information during the manufacturing process. Thus, the systems and processes described herein may obviate the need for human and/or manual inspection protocols, while saving resources and reducing cycle time.

Figure 8:
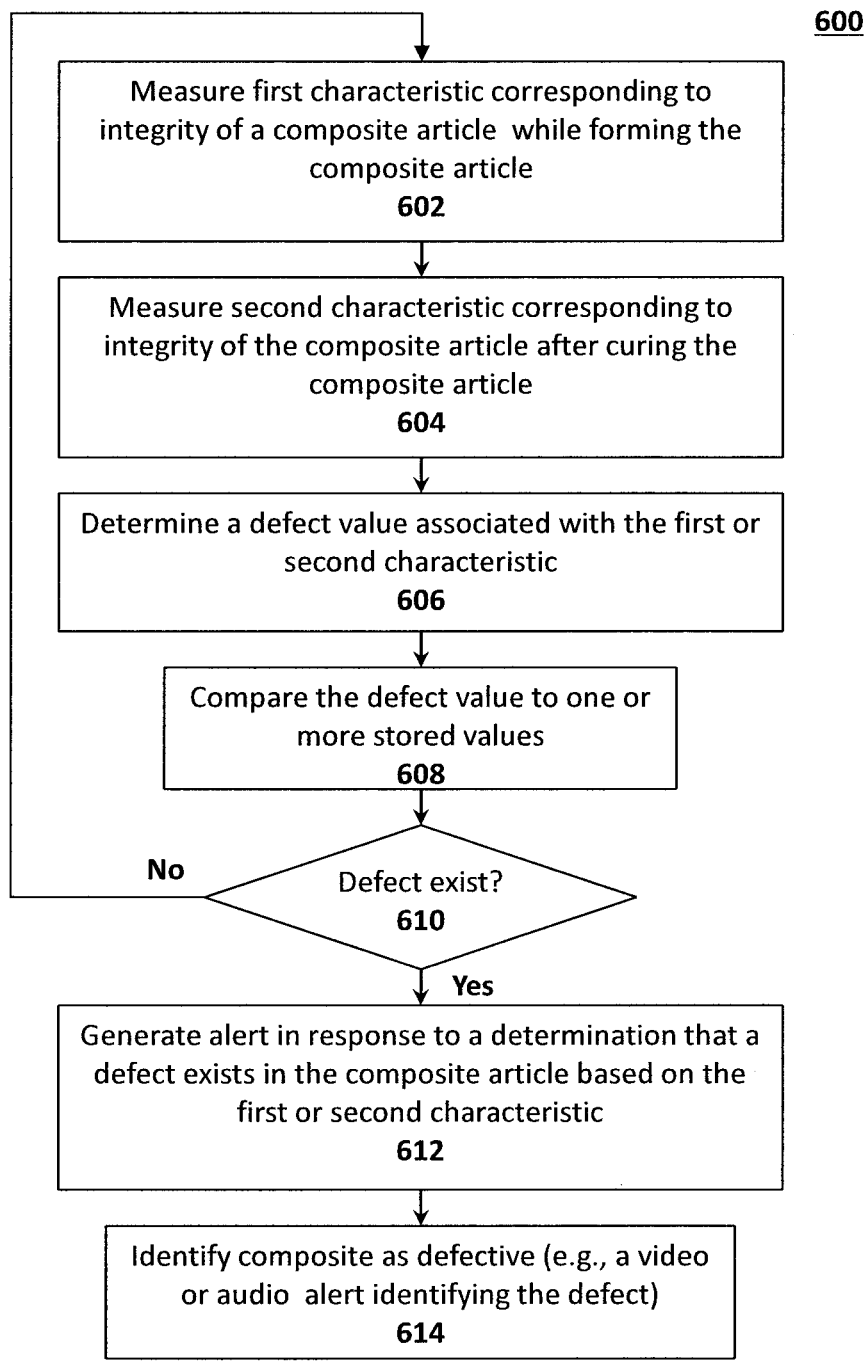
FIG. 8 illustrates a flowchart of an example automation system.

FIG. 8 illustrates a flowchart of an example implementation of an inspection automation system (e.g., inspection automation system 100). The computer 102 and core platform 104 may implement the method 600 of FIG. 8 by executing machine-readable instructions, such as stored on a non-transitory machine-readable storage device, such as data store 139. The present methods and systems may be realized in hardware, software, and/or a combination of hardware and software. Example implementations include an application specific integrated circuit and/or a programmable control circuit.

The method 600 measures (e.g., by sensors 110a-d) a first characteristic corresponding to integrity of a composite article after application of a plurality of layers of one or more raw materials at block 602. For example, after a layup process is performed, an in-situ non-contact ultrasound can be performed. The automated defect inspection can be applied to the material to identify wrinkles, folds, foreign objects, bubbles, voids, etc. Information regarding the inspection can be provided to the core platform for analysis, tracking, display for a human operator, etc. If a defect is present, at this stage an alert can be sent to a human operator (e.g., via HMI 112) and/or information can be sent to an automated manufacturing tool (e.g., actuation system 108) to adjust an operation of the manufacturing process.

Additionally or alternatively, at block 604, the method measures (e.g., by sensors 110*a-d*) a second characteristic corresponding to integrity of the composite article after curing the composite article. For example, the after the composite article is heated and cured, an in-situ validation process is performed to determine is a defect is present (e.g., wrinkles, folds, foreign objects, bubbles, voids, etc.). If the second characteristic reveals a defect, at this stage an alert can be sent and/or information can be sent to an automated manufacturing tool, as with block 602.

In block 606, the method determines (e.g., by core platform 104) whether a defect value exists, as described herein. At block 608, the defect value is compared to a plurality of defect values (e.g., one or more threshold values stored in data store 139). For example, the stored values can be stored in a library or matrix, and learned and/or updated via a trend analysis manager (e.g., trend manager 138). Whether a defect exists is determined, in block 610, based on processing of the measured and stored data (e.g., via the state manager 136). For example, if the method determines that no defect exists, the method returns to block 602 to continuously monitor the characteristics of the composite article.

If a defect is identified in the composite article (e.g., via the state manager 136), the method generates an alert in block 612. As described herein, the alert can be an audible or visual alert to a human operator (e.g., via HMI 112) and/or presented to an actuation system (e.g., actuation system 108) to adjust an operation of the manufacturing process. In some examples, the method designates the manufactured article as containing a defect based on the comparison in block 614. In response, the defective article can be singled out for further inspection, destruction, etc.

These systems and methods described herein may be similarly useful in trend analytics for different fields, such as flight operational quality assurance (FOQA), flight data monitoring (FDM), and flight data analysis for airplanes, engine maintenance for cars, as well as other data intensive environments.

Early identification and adjustment of a manufacturing process in response improves overall quality and yields a higher proportion of saleable products for delivery, with the added benefit of increasing output quantity as a result. In terms of commercialization, these systems and methods can tools to increase competitiveness for manufacturers who employ them.

The market for smart factory technology is currently valued in the hundreds of billions of dollars, and is expected to continue to grow at a healthy rate over the next several years. In order to remain competitive in the manufacturing market, manufacturers should develop smarter tools that will enable greater production efficiencies. The disclosed systems and methods provide for manufacturer's hardware and software to advance the principles of lean manufacturing while maintaining or exceeding quality benchmarks.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. An automated inspection system for monitoring a manufacturing process comprising:
   a core platform to operatively connect a plurality of systems or subsystems via one or more interfaces; and
   a sensor system operatively coupled with the core platform to monitor one or more characteristics corresponding to an integrity of a composite article being manufactured, the core platform configured to:
      receive a first measurement of the one or more characteristics corresponding to the integrity of the composite article from the sensor system during layup of the composite article;
      identify a defect in the composite article after curing by analyzing the first measurement vis-à-vis a database of historical data using one or more machine-learning techniques;
      receive a second measurement of the one or more characteristics corresponding to the integrity of the composite article from the sensor system after curing the composite article;
      analyze the defect and the second measurement vis-à-vis the database;
      determine whether the defect is present in the composite article after curing; and
      generate an alert in response to a determination that the defect exists in the composite article.

2. The automated inspection system of claim 1, further comprising a state manager operatively coupled with the core platform to determine whether the defect associated with the one or more characteristics is one of a first type of defect or a second type of defect.

3. The automated inspection system of claim 2, wherein the state manager is configured to:
   identify a value corresponding to the one or more characteristics associated with the defect based on the first measurement or the second measurement; and
   calculate a score representing a degree of the defect of the composite article based on the value.

4. The automated inspection system of claim 1, wherein the defect comprises one of a first defect, a second defect, or a third defect, and wherein the core platform is further configured to:
   receive data regarding a third measurement of the one or more characteristics corresponding to integrity of the composite article after performing a trim operation on the composite article;
   determine whether the third defect exists in the composite article based on the third measurement; and
   generate an alert in response to a determination that the third defect exists in the composite article.

5. The automated inspection system of claim 1, wherein the core platform is configured to transmit the alert to a human machine interface, the alert comprising one of an audible or visual alert presented by the human machine interface.

6. The automated inspection system of claim 1, further comprising an actuation system operatively coupled with the core platform to implement the manufacturing process based on instruction from the core platform, wherein the core platform transmits the alert and information regarding the defect to the actuation system to adjust an operating value of the manufacturing process of the automated inspection system.

7. The automated inspection system of claim 6, wherein the operating value comprises one of a speed of the manufacturing process, a temperature at which the composite article was cured, or a position of the composite article.

8. The automated inspection system of claim 1, wherein the sensor system is operatively coupled with one or more of a non-contact ultrasound sensor, a laser sensor, an impedance sensor, an infrared sensor, or a heat sensor.

9. The automated inspection system of claim 8, wherein the sensor system monitors the one or more characteristics by two or more sensors of the sensor system to determine the defect.

10. The automated inspection system of claim 1, wherein the one or more characteristics comprise one of a density, a temperature, a chemical composition, or a thickness associated with the composite article.

11. The automated inspection system of claim 1, wherein the one or more machine-learning techniques employs one or more artificial neural networks.

12. The automated inspection system of claim 1, further comprising a trend manager operatively coupled with the core platform to populate the database a library with a matrix of values that correlates a type of defect with the one or more characteristics.

13. A method of determining an integrity of a composite article comprising:
   measuring, by a sensor system, a first characteristic corresponding to the integrity of the composite article during layup of the composite article;
   identifying a defect present in the composite article after curing by analyzing the defect vis-à-vis a database of historical data using one or more machine-learning techniques;
   measuring, by the sensor system, a second characteristic corresponding to the integrity of the composite article after curing the composite article;
   analyzing, at a core platform, the first characteristic and the second characteristic vis-à-vis the database;
   determining whether the identified defect is present in the composite article after curing; and
   generating an alert in response to a determination that the defect exists in the composite article based on the first measurement or the second characteristic.

14. The method of claim 13, further comprising:
   determining, by the core platform, a defect value associated with the first characteristic or the second characteristic;
   comparing the defect value to a plurality of defect values; and
   designating the composite article as containing a defect based on the comparison of the defect value to the plurality of defect values.

15. The method of claim 14, further comprising:
   identifying, by the core platform, a stage at which the defect appears; and
   adjusting an operating value of a manufacturing process based on the identification of the stage at which the defect appears.

16. The method of claim 15, wherein the operating value comprises one of a speed of the manufacturing process, a temperature at which the composite article was cured, or a position of the composite article.

17. The method of claim 13, wherein the first characteristic or the second characteristic comprises one of a density, a temperature, a chemical composition, or a thickness associated with the composite article.

18. The method of claim 13, further comprising transmitting the alert to a human machine interface operatively coupled with the core platform.

19. An automated inspection system for monitoring integrity of a composite article during different stages of a manufacturing process, the automated inspection system comprising:
   an actuation system configured to adjust one or more parameters of the manufacturing process;
   a sensor system configured to monitor one or more characteristics corresponding to an integrity of the composite article during the manufacturing process, wherein the sensor system comprise a non-contact ultrasound to capture the first characteristic; and
   a processor operatively coupled to each of the actuation system and the sensor system, wherein the processor is configured to:
      determine, via the sensor system, a first characteristic corresponding to the integrity of the composite article during layup of the composite article;
      identify, via a processor, whether a defect is present in the composite article after curing by analyzing the first characteristic vis-à-vis a database of historical data using one or more machine-learning techniques;
      adjust, via the actuation system, one or more parameters of the manufacturing process to mitigate manifestation of the defect;
      measure, by the sensor system, a second characteristic corresponding to the integrity of the composite article after curing the composite article;
      determine, via the processor, whether the defect is present in the composite article after curing the composite article; and
      generate, via the processor, an alert if the defect is present.

20. The automated inspection system of claim 19, wherein the processor is configured to complete an inspection checklist for the composite article for display via a human machine interface.

* * * * *